United States Patent [19]
Morton

[11] Patent Number: 4,798,500
[45] Date of Patent: Jan. 17, 1989

[54] METHOD OF LAUNCHING LONG PIPELINES

[75] Inventor: Arthur W. Morton, Houston, Tex.

[73] Assignee: Conoco Inc., Ponca City, Okla.

[21] Appl. No.: 547,290

[22] Filed: Dec. 12, 1983

Related U.S. Application Data

[63] Continuation of Ser. No. 313,873, Oct. 22, 1981, abandoned, which is a continuation-in-part of Ser. No. 258,909, Apr. 30, 1981, abandoned.

[51] Int. Cl.⁴ .............................................. F16L 1/04
[52] U.S. Cl. .................................. 405/158; 405/166; 405/171
[58] Field of Search ........ 405/154, 158, 166, 168–171; 414/747

[56] References Cited

U.S. PATENT DOCUMENTS

| | | | |
|---|---|---|---|
| 2,731,800 | 1/1956 | Collins | 405/171 X |
| 3,727,417 | 4/1973 | Shaw | 405/171 |
| 4,073,156 | 2/1978 | Smith | 405/166 X |
| 4,183,697 | 1/1980 | Lamy | 405/171 X |
| 4,326,821 | 4/1982 | Stefens | 405/171 |

Primary Examiner—Randolph A. Reese
Assistant Examiner—John A. Ricci
Attorney, Agent, or Firm—Richard K. Thomson

[57] ABSTRACT

A long pipeline is constructed at an on-shore site and then launched into a body of water. A tension force is maintained on the pipeline during launching to hold the pipeline off the floor of the body of water.

11 Claims, 6 Drawing Sheets

METHOD OF LAUNCHING LONG PIPELINES

This application is a continuation of application Ser. No. 313,873, filed Oct. 22, 1981, now abandoned, which is a continuation-in-part of application Ser. No. 258,909, filed Apr. 30, 1981, now abandoned.

BACKGROUND OF THE INVENTION

1. Field of the Invention

This invention relates generally to methods of launching pipelines from an on-shore site into a body of water and of maintaining the pipeline above a floor of the body of water during the launching procedure.

2. Description of the Prior Art

The construction of off-shore oil or gas production facilities often requires the placement of a long pipeline on or near the ocean floor, for example, to connect a satellite well to a central producing platform.

The most common way of manufacturing the pipelines and placing them on the ocean floor is to construct the pipeline on a lay barge and to lower the constructed pipeline from the lay barge onto the ocean floor as the pipeline is constructed.

In some situations, however, it is not possible to construct the pipeline on a lay barge and simultaneously lower it onto the ocean floor because of the severe environmental conditions present. This is often the case when production facilities are being constructed in the North Sea area. Also, some flowline bundles are too complex to construct on a lay barge.

It has been proposed that an entire pipeline be constructed at an on-shore construction site and subsequently be launched from the on-shore construction site and into a body of water and then towed through the body of water to the installation site.

SUMMARY OF THE INVENTION

In some geographic locations particular problems are presented to the launching of a pipeline from an on-shore site due to off-shore shallow water depths, sandy bottom conditions which create a very high drag on any tow cable which is allowed to engage the bottom of the ocean floor, and large boulders located off-shore in the launching area. The present invention provides a very much improved method of launching long pipelines which holds the pipeline above the ocean floor during the launching procedure and allows it to be immediately towed away from the launch site in a catenary configuration.

This method includes the supporting of the pipeline at the on-shore site with a plurality of ground engaging movable support means spaced along a length of the pipeline, said means of said plurality of support means being connected together by a support connecting line.

A shallow draft barge is positioned off-shore from the launching site. A main launching line is deployed seaward from a seaward end of the barge to a main buoy located at a position in the body of water where the body of water has a depth sufficient to allow a launch vessel to approach the main buoy. The main launching line is provided with sufficient buoyancy means to hold the launching line above the floor of the body of water.

A pipeline launch line is connected between a landward end of the barge and a seaward end of the pipeline. A support means launch line is connected between the landward end of the barge and a seaward end of the support connecting line.

The seaward end of the main launching line is disconnected from the main buoy and connected to the launch vessel. When the body of water is at substantially its high tide mark, the launch vessel then steams seaward and tows the pipeline and support connecting line into the body of water. This towing is done at a speed sufficient to tow the entire length of the pipeline into the body of water while the body of water is at substantially its high tide mark. As the pipeline is towed into the body of water, a retarding force is applied to the pipeline to thereby maintain a tension force on the pipeline sufficient to hold the pipeline above the floor of the body of water. This retarding force is preferably supplied by a known frictional force between the ground engaging support means and the ground (e.g., between sled runners and a pair of rails), or it may be supplied by a retarding line attached to a landward end of the pipeline and/or the support connecting line.

Once the landward end of the pipeline reaches a position in the body of water sufficient that a trailing tow vessel may approach the landward end of the pipeline, a trailing tow line is connected to the trailing tow vessel and a tensional retarding force is applied to the trailing tow line and the pipeline by means of the trailing tow vessel to hold the pipeline above the floor of the body of water. Then the retarding line means is disconnected from the landward end of the pipeline. A leading tow line is then connected between a leading tow vessel and the seaward end of the pipeline and the pipeline launch line is disconnected from the pipeline.

At this point the pipeline is suspended in a catenary fashion between the leading tow vessel and the trailing tow vessel and may be immediately towed to the installation site. This entire launching procedure is accomplished without the pipeline engaging the ocean floor so as to avoid the problems previously mentioned.

It is therefore a general object of the present invention to provide an improved method of launching a pipeline from an on-shore site.

Another object of the present invention is to provide a method for launching a pipeline from an on-shore site while holding the pipeline above the ocean floor.

Yet another object of the present invention is the provision of a method for launching a long pipeline from an onshore site where shallow off-shore conditions prevent a leading tow vessel from connecting a tow line directly to a seaward end of the pipeline to launch the same.

Still another object of the present invention is the provision of a method for launching pipelines wherein all tow cables are kept above the ocean floor so as to prevent problems created by the drag of tow cables on the ocean floor.

Yet another object of the present invention is the provision of methods for launching long pipelines wherein the pipeline will be launched at relatively high speeds to take advantage of tide changes.

And another object of the present invention is the provision of methods for launching pipelines at high launching speeds wherein the launching speeds are controllable through a braking system.

Other and further objects, features and advantages of the presnt invention will be readily apparent to those skilled in the art upon a reading of the following disclosure when taken in conjunction with the accompanying drawings.

DETAILED DESCRIPTION OF THE PREFERRED EMBODIMENT

The methods of the present invention are particularly adapted for use with a pipeline system such as is disclosed in U.S. patent application Ser. No. 048,316 of Arthur W. Morton, filed June 14, 1979, and for use with subsequent methods of towing such a pipeline as also disclosed in said prior application, which application is assigned to the assignee of the present invention.

Figure 6:
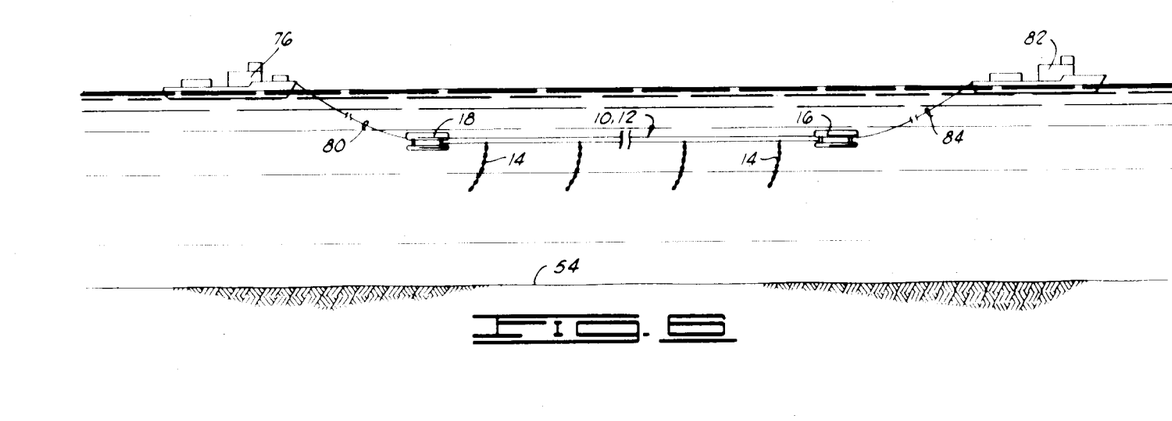
FIG. 6 is a schematic elevation view of a pipeline being towed in a catenary fashion between a leading tow vessel and a trailing tow vessel.
Figure 7:
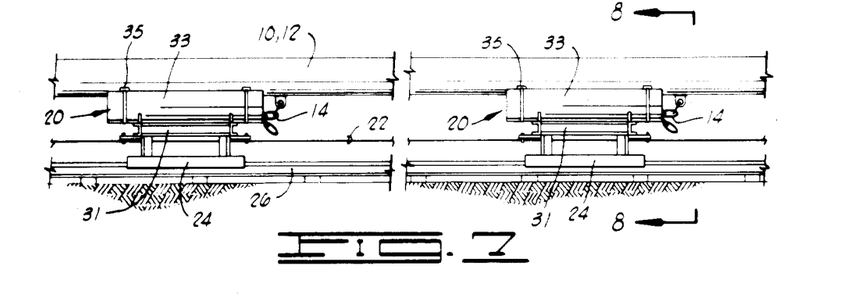
FIG. 7 is a side elevation view of a pipeline system supported by a plurality of ground engaging movable support means.
Figure 8:
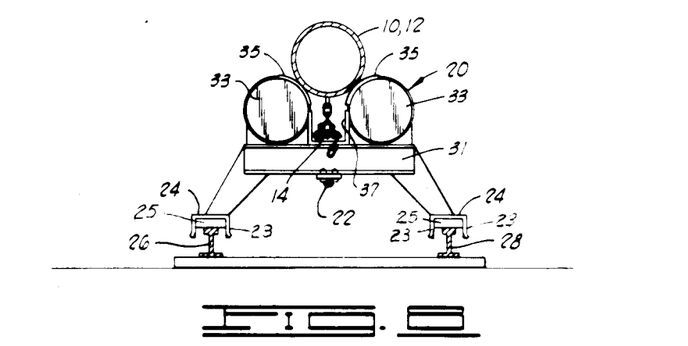
FIG. 8 is a front elevation view of the system of FIG. 7 taken along line 8—8 of FIG. 7.

Referring now to FIGS. 7 and 8, a pipeline system 10 includes a pipeline 12 having a plurality of chain weights 14 attached thereto. As can be seen in FIG. 6, the pipeline system 10 also includes a leading pipeline sled assembly 16 defining a seaward end of pipeline 12, and includes a trailing pipeline sled assembly 18 defining a landward end of pipeline 12. Pipeline system 10 is constructed in accordance with the teachings of application Ser. No. 048,316. Pipeline 12 itself has a positive buoyancy. Chain weights 14 give the entire system 10 a negative buoyancy, so that in the absence of any lifting forces from outside sources pipeline system 10 will assume a position with pipeline 12 floating off bottom and chain weights 14 engaging the bottom of body of water 30.

As shown in FIGS. 7 and 8, the pipeline system 10 is supported at an on-shore construction site by a plurality of ground engaging support means 20 which are spaced along a length of the pipeline system 10. The support means 20 are connected together by a support connecting line 22 which may be a steel cable. The connecting line 22 may be a continuous cable being attached at intermediate points to the various support means 20, or it may be comprised of a plurality of cable segments having their ends attached to adjacent support means 20.

The support means 20 are movable relative to the ground surface so that when the pipeline system 10 is towed into the ocean, support means 20 will move with the pipeline system 10.

One manner of construction of the support means 20 is shown in FIGS. 7 and 8, and includes a plurality of sleds having runners 24 slidably engaging a pair of parallel rails 26 and 28 extending into a body of water 30. Thus, sleds having runners engaging rails, which rails are mounted on the ground, may be generally referred to as ground engaging support means.

The support means 20 of FIGS. 7 and 8 each include a frame 31 supported from runners 24. Attached to frame 31 are a pair of spaced parallel cylindrical buoyancy tanks 33. The pipeline 12 rests on cushions 35 attached to the tanks 33, and the chain weights 14 are supported in a channel 37 attached to frame 31 between tanks 33. The tanks 33 have a buoyancy less than the weight of support means 20 including tanks 33, therefore support means 20 will not float when it is disengaged from pipeline system 10.

Each of the runners 24 includes a wooden skid 25. The skids 25 are attached to runners 24 by bolts (not shown) which are countersunk into the bottom of the skids so that they will not engage the rails 26 or 28 as the skids 25 wear down.

The rails 26 and 28 are covered with tallow so that a wood on tallowed steel friction factor is provided between the sleds 20 and the rails 26 and 28. The wooden skids 25 preferably are oak, and this friction factor for tallowed oak on steel rails has been determined to be in the range of about 0.12 to 0.18. Since the weight of the sleds and the loads carried thereby may be determined this provides a predetermined frictional force between the sleds and the rails based upon this friction factor.

Figure 9:
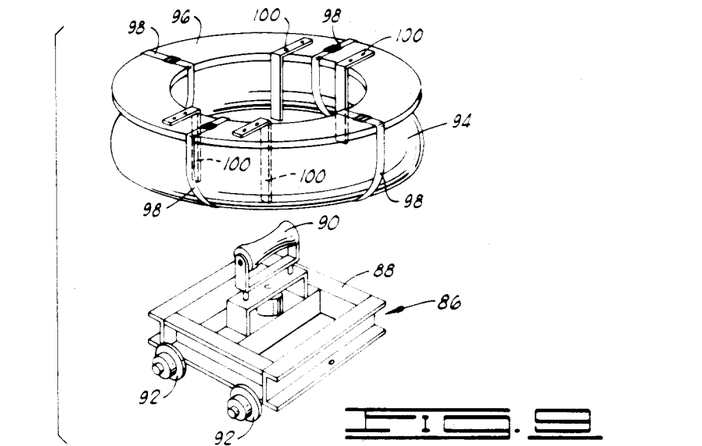
FIG. 9 is an exploded view of an alternative form of ground engaging support means which includes a floatation means so that the support means will float once it is disengaged from the pipeline.

Other advantages are also provided by the use of support means 20 with runners as shown in FIGS. 7 and 8 as compared to support means 86 with wheels as shown in FIG. 9.

If the rails 26 and 28 are worn, or for other reasons are not uniformly and accurately positioned, support means 86 with wheels 92 can sometimes "jump" the rails at high speed. The inverted channel shape design of runners 24 with downwardly depending flanges 23 allows some lateral movement of runners 24 relative to rails 26 and 28 thus allowing the sled to function satisfactorily on rails which would not provide a satisfactory track for a wheeled apparatus.

Also, the combination of properly sized runners 24 and buoyancy tanks 33 provides a support means 20 which can be pulled across the ocean floor without digging into the ocean floor. This is generally not provided by a wheeled apparatus because the wheels dig into the ocean floor. To provide this proper combination it is necessary to know the bearing pressure which can be supported by the ocean floor. The bearing area of the runners 24 is dependent on their size. The submerged weight of the support means 20 can be controlled by modifying the volume of water displaced by buoyancy tanks 33.

Referring now to the sequential series of FIGS. 1-5, and beginning with FIG. 1, the method of the present invention is described below.

Figure 1:
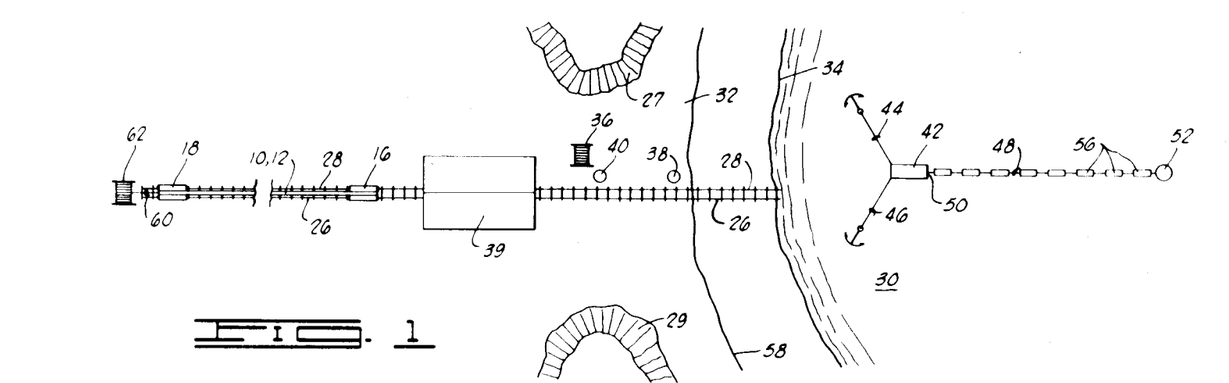
FIGS. 1-5 comprise a sequential series of schematic plan drawings illustrating the method of the present invention.

FIG. 1 illustrates a portion of an on-shore site 32. The rails 26 and 28 have their seaward ends extending into the body of water 30 to a point 34 defining the low tide mark of the body of water 30. Sand dunes 27 and 29 are shown.

The rails 26 and 28 extend landward through a construction facility 39 and then further landward for a distance of approximately one mile. The pipeline system 10 is constructed in the construction facility 39 and is stored on the rails 26 and 28 prior to launching.

Located near the rails 26 and 28 are an on-shore winch 36 and first and second turning blocks 38 and 40.

In FIG. 1, a shallow draft barge 42 has been positioned off-shore from the site 32 and is anchored by means of anchor lines 44 and 46. Barge 42 may also be referred to as an intermediate floating vessel 42.

A main launching line 48 is deployed seaward from a seaward end 50 of barge 42 to a main buoy 52.

The floor 54 (see FIG. 6) of body of water 30 is at such a shallow depth at the location of barge 42 that it would not be possible for a typical launch vessel to reach that location because there is insufficient draft to float the launch vessel. The main buoy 52 is located at a position in body of water 30 sufficient to allow a launch vessel to approach main buoy 52.

The main launching line 48 is provided with sufficient buoyancy means 56 to hold main launching line 48 above the floor 54 of body of water 30. It will be appreciated by those skilled in the art that the buoyancy means 50 may either be separate detachable elements attached to an otherwise non-buoyant line 48, or the line 48 may be constructed in such a manner and of such materials that the line 48 has an inherent buoyancy.

Also illustrated in FIG. 1 is the high tide mark 58 of body of water 30. The present invention is particularly adapted to launching the pipeline system 10 at high tide, and is adapted for launching at high speeds so that the entire launching procedure can be accomplished while the body of water 30 is at or substantially near its high tide mark 58.

Preferably, support means 20 with runners 24 having wooden skids 25 running on tallowed rails 26 and 28 are utilized so that a known friction force is provided between the support means 20 and the rails 26 and 28 to apply a retarding force on pipeline 12 sufficient to hold it in tension and hold it above the ocean floor as the pipeline 12 is towed into the body of water. When that system is used there is no need to initially attach a retarding line to the landward end of the pipeline 12.

If, however, a wheeled support means 86 like that shown in FIG. 9 is used, it may be necessary to attach a retarding line 60 (see FIG. 1) to the landward end 18 of pipeline system 10 and to the landward end of the support connecting line 22. Retarding line 60 is mounted upon a retarding winch 62. This retarding line 60 is then used to hold pipeline system 10 in tension as it is towed into the body of water.

Figure 2:
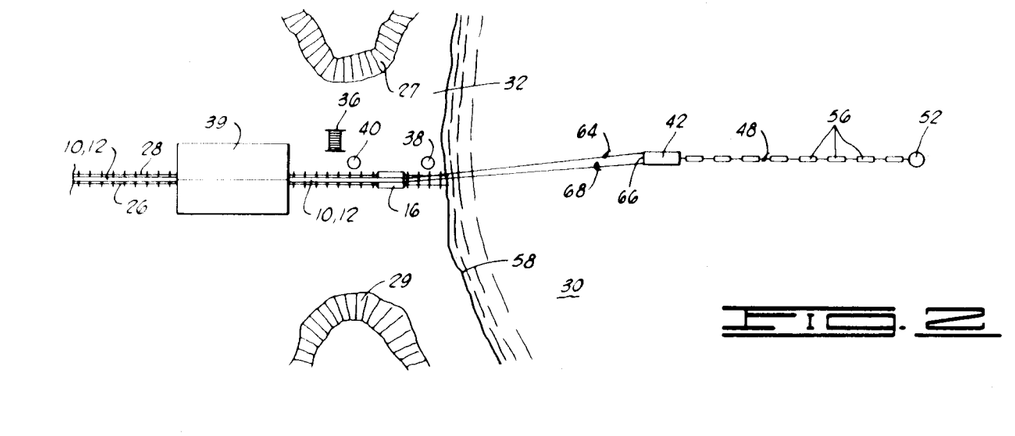

Referring now to FIG. 2, the pipeline system 10 has been moved seaward from the position shown in FIG. 1 to a position wherein the seaward end 16 is located near the high tide mark 58. This movement is preferably accomplished by use of the winch 36 and a pulling line (not shown) extended from winch 36 around turning block 38 and connected to seaward end 16 of pipeline system 10.

When the pipeline system 10 is in approximately the position shown in FIG. 2, a pipeline launch line 64 is connected between a landward end 66 of barge 42 and the seaward end 16 of pipeline system 10. A support means launch line 68 is similarly connected between barge 42 and a seaward end of support connecting line 22.

Figure 3:
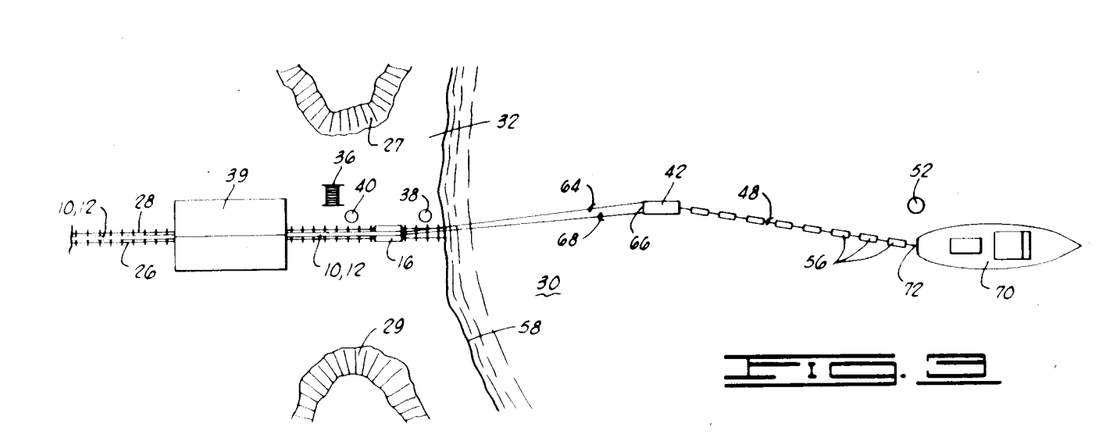
Figure 4:
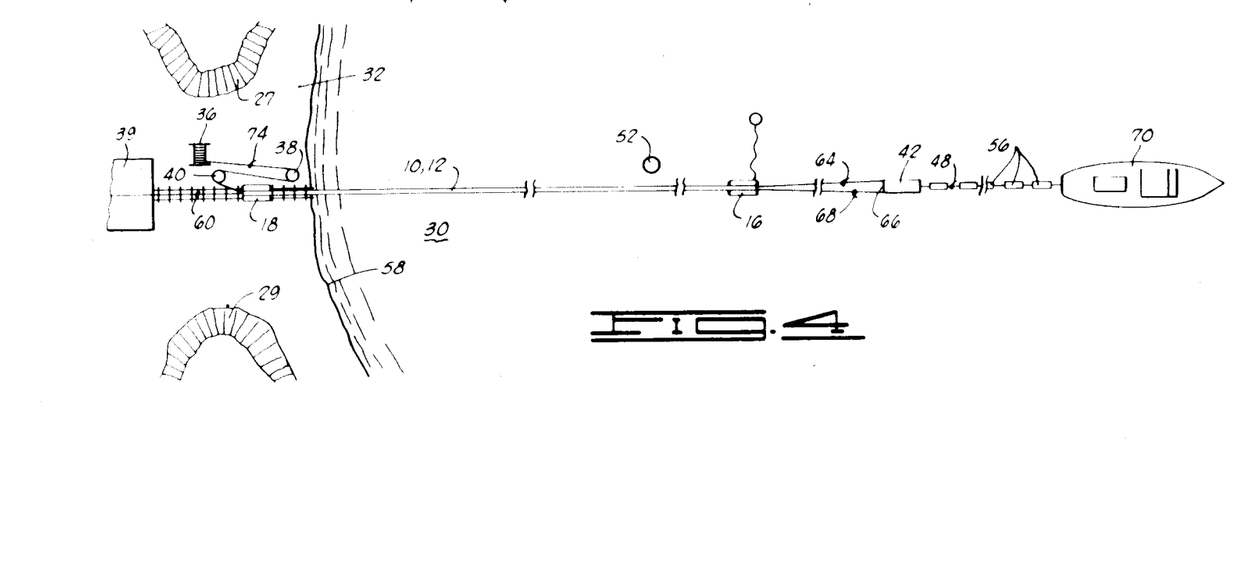

Referring now to FIG. 3, a launch vessel 70 approaches main buoy 52 and a seaward end 72 of main launching line 48 is disconnected from main buoy 52 and is connected to the launch vessel 70 as shown in FIG. 3. Next, as illustrated in FIG. 4, the launch vessel 70 moves seaward and thereby tows the pipeline system 10 and the support connecting line 22, with attached support means 20, into the body of water 30. In FIG. 4, only the pipeline system 10 is shown to simplify the illustration. The support connecting line 22 and support means 20 are generally still located below the pipeline system 10 and are submerged in the body of water 30.

As the pipeline system 10 and support connecting line 22 are towed into the body of water 30, a retarding force is applied thereto to maintain a tension on the pipeline system 10 sufficient to hold the pipeline system 10 above the floor 54 of body of water 30.

This retarding force is preferably applied by providing a known friction force between support means 20 and rails 26 and 28 through the use of wooden skids 25 engaging tallowed rails 26 and 28. This frictional force should be of a magnitude such that it is greater than any gravitational forces present due to inclines in rails 26 and 28. In that manner the known frictional forces also provide a braking force sufficient to hold the pipeline system 10 in place if the towing operation is terminated.

With the arrangement just described the launching force which must be provided by launch vessel 70 is determined by the frictional forces between skids 25 and rails 26 and 28. As the pipeline system 10 is towed into the body of water the total of the frictional forces continually decreases so that a continually decreasing towing force is required. The pipeline system 10 is preferably towed at a substantially constant speed in the range of about 250–300 feet per minute, which is approximately the fastest speed at which a man can walk beside the moving pipeline and perform manual operations thereon. Preferably contact is maintained by radio between an observer monitoring the speed of the pipeline and the operator of the launch vessel 70.

If the retarding line 60 is used the retarding force is applied to retarding line 60 by means of retarding winch 62 which retarding force is sufficient to maintain a tension on the pipeline system 10 sufficient to hold the pipeline system 10 above the floor 54 of body of water 30. Also the retarding line 60 and retarding winch 62 provide a braking system for controlling the high launching speed of pipeline system 10.

With either method of applying the initial retarding force, when the landward end 18 of pipeline system 10 reaches approximately the position illustrated in FIG. 4 a polypropylene seagoing retarding line 74 is connected to the landward ends of both pipeline system 10 and support connecting line 22, and the first retarding line 60 (if used) is disconnected. The tensional force on pipeline system 10 and support connecting line 22 is maintained by seagoing retarding line 74.

Figure 5:
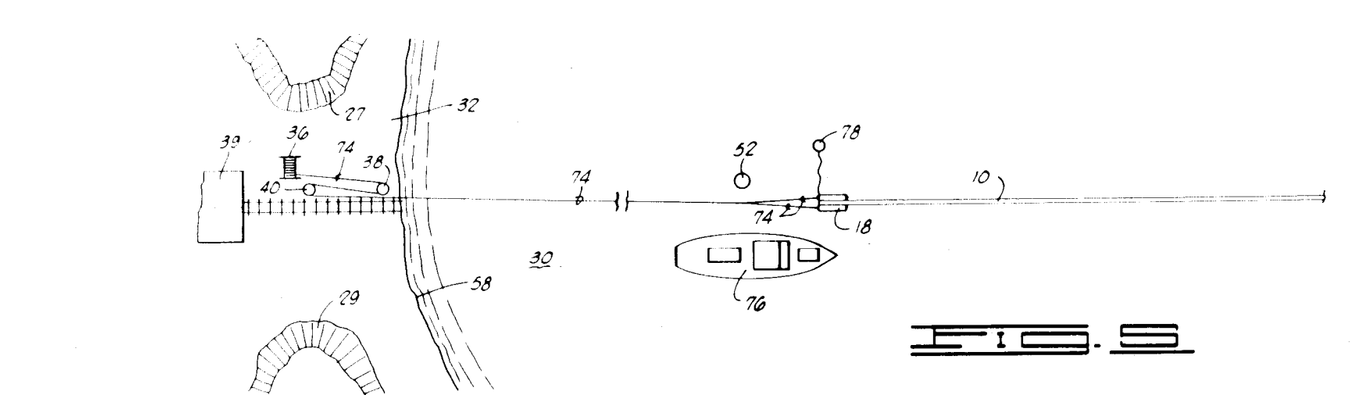

Referring now to FIG. 5, the launch vessel 70 has continued to tow the pipeline system 10 into the body of water 30 until the landward end 18 of pipeline system 10 has reached a position in the body of water 30 wherein the body of water 30 has a depth sufficient to float a trailing tow vessel 76.

A pennant buoy 78 is then picked up by trailing tow vessel 76 and a trailing tow line 80 (see FIG. 6) is connected between the landward end 18 of pipeline system 10 and the trailing tow vessel 76.

Then, trailing tow vessel 76 applies a tensional retarding force to trailing tow line 80 to hold pipeline system 10 above the floor 54 of body of water 30, and the seagoing retarding line means 74 is disconnected from the pipeline system 10.

A leading tow vessel 82 is then connected to seaward end 16 of pipeline system 10 by a leading tow line 84 and the pipeline launch line 64 is then disconnected from the pipeline system 10. At that point, the pipeline system 10 has the appearance shown in FIG. 6 where it is suspended in a catenary fashion between leading tow vessel 82 and trailing tow vessel 76.

FIG. 9 illustrates an alternative manner of construction of the support means. The support means of FIG. 9 is designated by the numeral 86, and is a floating support means 86. The floating support means 86 includes a structural frame 88 having a saddle member 90 extending upwardly therefrom for engagement with pipeline 12. Attached to the frame 88 are a plurality of wheels 92 for engagement with the rails 26 and 28. It will be understood by those skilled in the art that skids or runners such as runners 22 could be substituted for the wheels 92.

Attached to the support means 86 is a float 94. The float 94 is preferably a toroidal shaped inflatable elastomeric member. The float 94 may be an innertube from a pneumatic tire or the like, and thus is relatively inexpensive.

The float 94 is attached to the frame 88 by an annular wooden support piece 96. Float 94 is attached to support piece 96 by a plurality of straps 98. The support piece 96 is itself attached to frame 88 by a plurality of brackets 100 the lower ends of which are welded to frame 88 and the upper ends of which are bolted to wooden support piece 96. As can be seen in FIG. 9, the toroidal float 94 fits around the saddle member 90.

Referring again to FIGS. 7 and 8, it is seen that each of the support means thereshown, supports a portion of the weight of the pipeline 12 and also supports one of the chain weights 14 which is piled up on top of the support means 20. Similarly, the chain weight 14 is layed on top of the wooden support piece 96 of support means 86.

Each of the floats 94 has a buoyancy greater than a combined weight of the float 94 plus the support means 86 to which it is attached, and less than a combined weight of the float 94, plus the support means 86 to which it is attached, plus the portion of the total weight of pipeline system 10 supported by the support means 86, so that when the portion of the total weight of pipeline system 10 carried initially by support means 86 is removed from the support means 86, the support means 86 will float to the surface of body of water 30.

As can be understood by viewing FIGS. 7 and 8, once the pipeline system 10 is in the body of water 30, the support means 86 will begin to submerge. As soon as support means 86 has moved slightly downward away from the pipeline 12, the only portion of pipeline system 10 then being supported by the support means 86 will be the weight of chain weight 14. As the depth of submergence of support means 86 below pipeline 12 increases, the portion of chain weight 14 being supported by the support means 86 will also decrease.

Thus, the float 94 preferably has a buoyancy less than a combined weight of the float 94, plus the support means 86, plus the chain weight 14, so that so long as the support means 86 is supporting a substantial portion of the chain weight 14, the support means 86 will be held under water.

When using an inflatable elastomeric float like the float 94, the overall design of the system must take into account the fact that as the inflatable elastomeric float 94 is submerged to deeper depths within the body of water, the external pressures acting upon the inflatable float increase thus decreasing the volume of water displaced by the float and thus decreasing the buoyancy of the float. For any given inflatable elastomeric float attached to a support means having a fixed submerged weight, it is possible to submerge the assembled float and support means to a depth such that the buoyancy of the float is decreased to a value less than the total weight of the float and the support means, so that the float is no longer capable of buoying the support means and at that point the entire assembly will sink to the bottom of the body of water. Thus, the design of the system must be such that the float 94 will not be submerged to this critical depth during the process of launching the pipeline.

Figure 10:
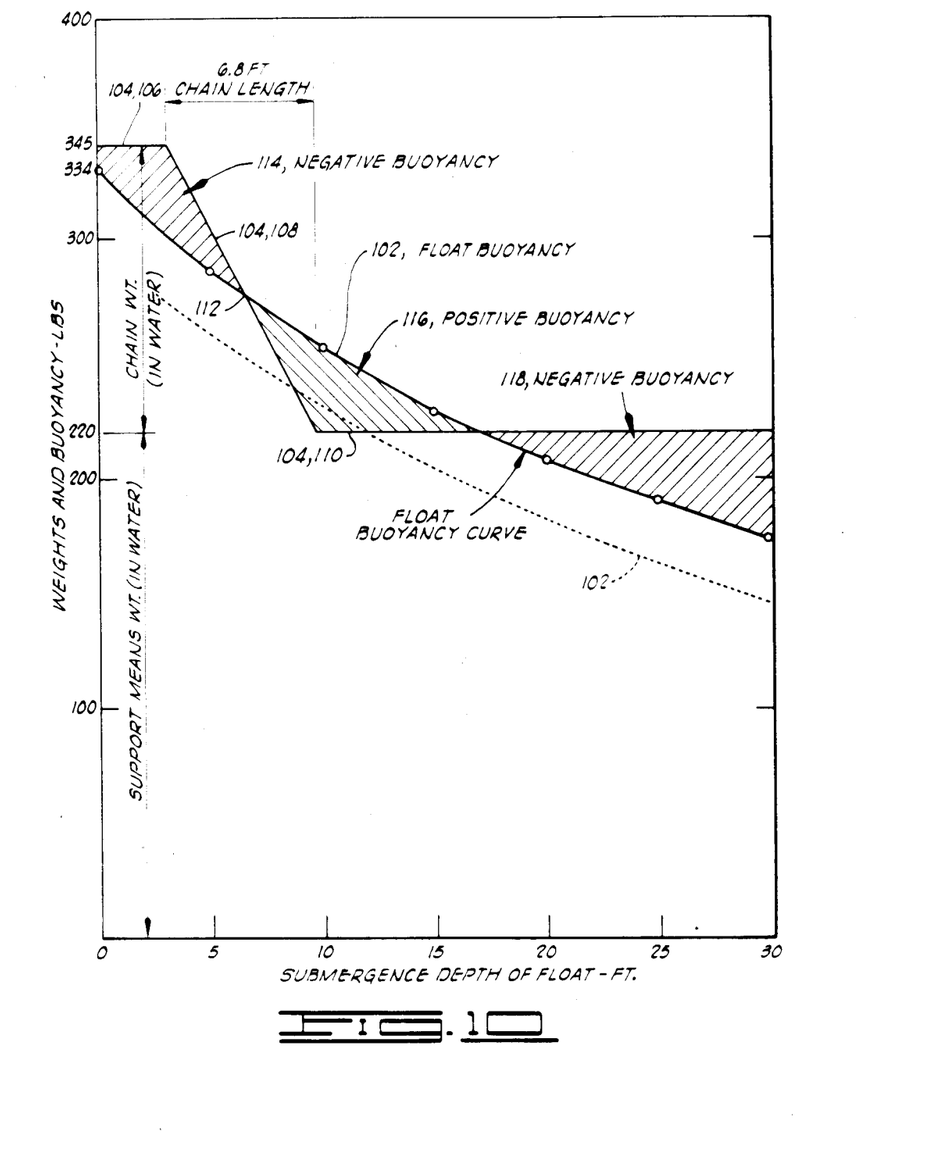
FIG. 10 is a graph describing the buoyancy of the system of FIG. 9 in relation to the depth of submergence of the float.

An example of such a design is illustrated in FIG. 10, which is a graph plotting the weight supported by float 94, and the buoyancy of the float 94, as a function of the depth to which the float is submerged.

In FIG. 10, the horizontal axis represents the submergence depth of the float 94 and the vertical axis is scaled in pounds and both weight and buoyancy are plotted on the vertical axis.

The curve 102 on FIG. 10 represents the buoyancy of float 94 as a function of depth of submergence. The position of curve 102 may be moved, for example, to the position shown in dotted lines, by varying the inflation pressure of float 94. It can be seen that for the particular example plotted in FIG. 10, the buoyancy of the float at the surface is equal to 334 pounds. A second curve 104 of FIG. 10 is a plot of the total of the weight of the support means 86, the float 94, and the portion of weight chain 14, if any, supported by support means 86 for a given submergence depth of float 94.

For a pipeline system 10 like that disclosed in the present application, the chain weight 14 has a length of 6.8 feet and a weight of about 18.4 pounds per foot in salt water, so that the chain weight 14 has a total weight of approximately 125 pounds. The combined weights of the support means 86 and the float 94 attached thereto is approximately 220 pounds. It will be understood that in the embodiment disclosed herein the weight of the float 94 itself is negligible so it can be said that the support means 86 weighs approximately 220 pounds. It is, however, possible that other types of float means might be attached to the support means 86 wherein the float itself would have a substantial weight, so it will be understood that in order for the float to support the entire apparatus to which it is attached after it is disengaged from the pipeline system 10, the float must have a buoyancy sufficient to overcome the weight of the support means and any weight of the float itself.

The combined weight of the support means 86 and the chain weight 14 is thus approximately 345 pounds as is represented by the left-most end of second curve 104.

It can be observed for a pipeline system 10 like that disclosed in the present application, that the pipeline 12 will float off the support means 86 when the float 94 is submerged to a depth of approximately three feet. Thus, the left-hand flat portion 106 of second curve 104 represents the first three feet of submergence of float 94 wherein the support means 86 still is supporting the entire 345 pound combined weight of chain 14 plus the support means 86. From a submergence depth of three feet to a submergence depth of 9.8 feet, the support means 86 will support a linearly decreasing portion of the weight of chain weight 14. Thus, the combined weight of the support means 86 plus the portion of the weight of chain weight 14 being supported thereby for depths of submergence between three feet and 9.8 feet is represented by the downwardly sloped portion 108 of curve 104.

At any submergence depth of greater than 9.8 feet, the chain weight 14 is no longer supported by the support means 86 so that the right-hand horizontal portion 110 of second curve 104 represents the weight of support means 86 of 220 pounds.

It can be seen in FIG. 10 that the second curve 104 first crosses the first curve 102 at a point 112 representing a submergence depth of approximately 7 feet for the float 94. Thus, at a submergence depth of 7 feet the buoyancy of float 94 is equal to the weight of support means 86 plus the portion of the weight of chain weight 14 being supported thereby, and the support means 86 will thus not sink any further. At this depth of about 7 feet any sideways thrust exerted on the float 94 will cause it to move sideways from under the chain weight 14 and the float 94, thus disengaging pipeline system 10, and support means 86 will pop to the surface of the body of water 30. It will be understood that some of the support means 86 may disengage themselves from pipeline system 10 before the entire pipeline 12 is towed into the body of water 30.

Thus, it is seen that it is important that the overall system design be such that the float 94 will never be submerged to a depth below the depth at which its buoyancy is greater than the weight of the support means. In the example shown in FIG. 10 this means that the float 94 should never be submerged to a depth greater than approximately 17 feet for if it is, then it will continue to sink due to decreasing buoyancy.

The summation of the forces acting upon the support means 86 due to its weight, supported weight, and buoyancy of float 94, may generally be described by looking at the relationship between the two curves 102 and 104. At the left-hand side of FIG. 10, the second curve 104 is above the first curve 102 thus representing the sinking of float 94 from a depth of zero feet to a depth of approximately 7 feet. This is a zone 114 of negative buoyancy wherein the weight exerted downward is greater than the upward buoyant force. At depths of submergence for float 94 between approximately 7 feet and 17 feet, the float 94 has a buoyancy greater than the weight being supported by support means 86 and thus there is a zone 116 of positive buoyancy. For depths of submergence greater than 17 feet, the buoyancy once again becomes less than the weight which is exerted downward upon support means 86 thus there is a second zone 118 of negative buoyancy.

Preferably the entire system is designed such that the chain weight 114 has a length such that when pipeline 12 is located substantially at the surface of body of water 30 and the chain weight 14 is extended downward substantially its entire length with the support means 86 located below and engaging the lower end of the chain weight, the float 94 attached to support means 86 has a buoyancy greater than the combined weight of the float 94 and the support means 86. This eliminates any possibility of the float 94 being submerged into the second negative buoyancy zone 118.

Figure 11:
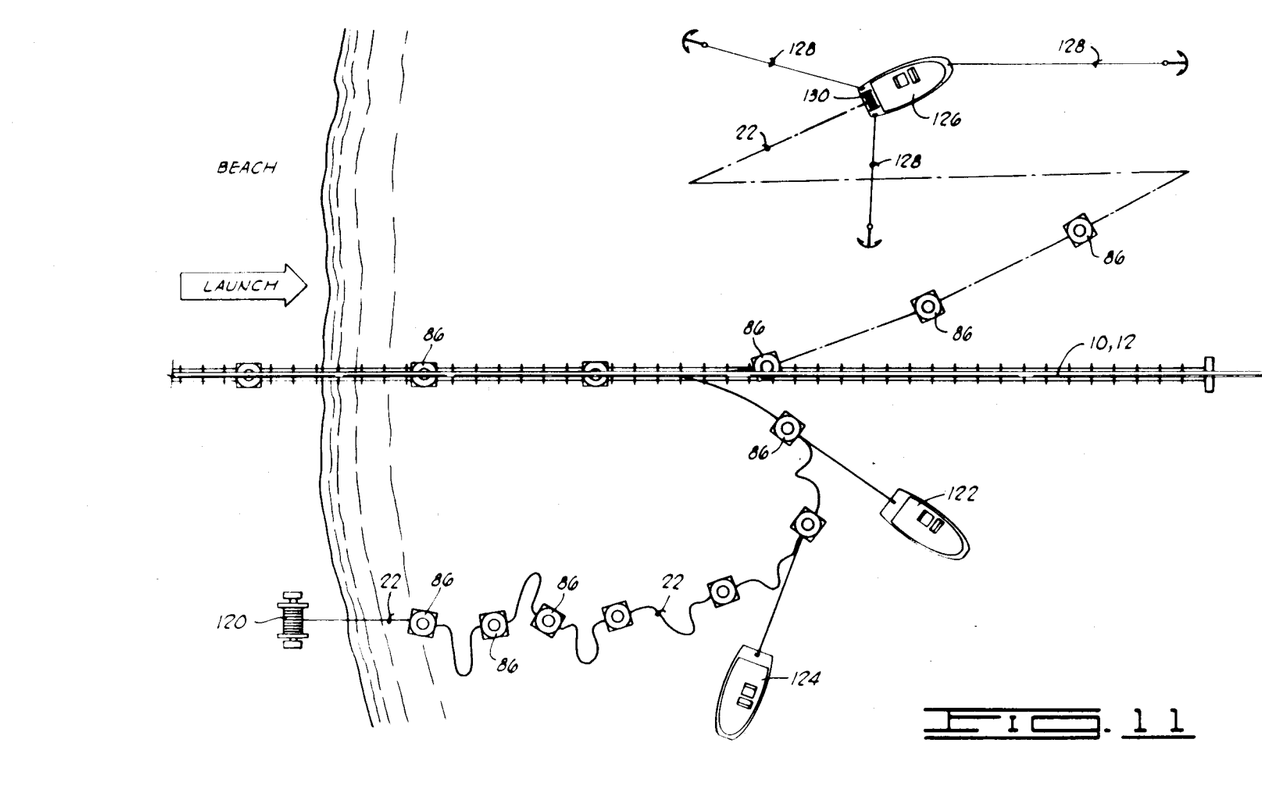
FIG. 11 is a schematic plan view illustrating several alternative methods of retrieving the floating support means of FIG. 9 after they are disengaged from the pipeline.

Referring now to FIG. 11, several methods are there schematically illustrated for retrieving the floating support means 86 after the pipeline system 10 has been launched.

As previously described, one of the final steps in the launching of the pipeline system 10 is the disconnection of pipeline launch line 64 from the seaward end of pipeline system 10. At the same time the support means launch line 68 is disconnected from support connecting line 22. If a non-floating type of support means such as support means 20 is utilized, then when it is disconnected from barge 42, the support connecting line 22 and all of the attached support means 20 will sink to the ocean floor. If, however, floating support means such as support means 86 are utilized, then the support connecting line 22 and all of the support means 86 will float to the surface of the body of water 30.

The floating support means 86 and support connecting line 22 may then be retrieved in any one of several manners. FIG. 11 simultaneously illustrates these various methods. A first manner of retrieving the floating support means 86 is to connect the support connecting line 22 to a retrieving winch 120 located on shore. Then the support connecting line 22 may be reeled into shore by the winch 120 thus also pulling the floating support means 86 onto shore.

A second method of retrieving the floating support means 86 is to connect small boats, such as boats 122 and 124, to the support connecting line 22 and the floating support means 86 and to tow the support connecting line 22 and floating support means 86 to shore.

A third method of retrieving is illustrated on the upper portion of FIG. 11 wherein a boat 126 is anchored in the body of water 30 by anchor lines 128 and the support connecting line 22 is connected to a retrieving winch 130 on the boat 126. Then the support connecting line 22 is reeled into the boat 126 by means of winch 130 thus pulling the support connecting line 22 and floating support means 86 into the boat 126.

Thus it is seen that the present invention readily achieves the ends and advantages mentioned as well as those inherent therein. While certain specific arrangements of parts and steps have been illustrated for the purposes of the present disclosure, numerous changes in the construction and arrangement of steps and parts may be made by those skilled in the art, which changes are encompassed within the scope and spirit of the present invention as defined by the appended claims.

I claim:

1. A method of launching a pipeline from an onshore site into a body of water, said method comprising the steps of:
supporting said pipeline at said onshore site with a plurality of ground engaging movable support means spaced along a length of said pipeline, said support means of said plurality of support means being connected together by a support connecting line;
positioning a launch vessel to a seaward end of said pipeline;
positioning an intermediate floating vessel offshore from said site, deploying a main launching line seaward from a seaward end of said intermediate floating vessel, and providing sufficient buoyancy means to hold said main launching line above said floor of said body of water;
connecting a pipeline launch line between a landward end of said floating vessel and said seaward end of pipeline;
connecting a support means launch line between said landward end of said intermediate floating vessel and said seaward end of said support connecting line;
connecting a seaward end of said main launching line to said launch vessel;
moving said launch vessel seaward and thereby towing said pipeline and said support connecting line into said body of water; and applying a retarding force to said pipeline and thereby maintaining a tension force in said pipeline, as said pipeline is towed into said body of water, sufficient to hold said pipeline above a floor of said body of water.

2. The method of claim 1, wherein:

said step of applying a retarding force to said pipeline includes a step of providing a predetermined frictional force between said support means and the ground sufficient to maintain said tension force in said pipeline.

3. The method of claim 2, wherein:

said step of applying a retarding force to said pipeline further includes the steps of:

connecting a retarding line means to a landward end of said pipeline before said landward end of said pipeline enters said body of water; and applying a retarding force to said retarding line means, thereby maintaining said tension force in said pipeline.

4. The method of claim 1 wherein:

said step of applying a retarding force to said pipeline includes the steps of:

connecting a retarding line means to landward ends of said pipeline and said support connecting line; and applying a retarding force to said retarding line, thereby maintaining a tension force in said pipeline and said support connecting line as said pipeline and support connecting line are towed into said body of water.

5. The method of claim 1, further comprising:

connecting a trailing tow line between a trailing tow vessel and a landward end of said pipeline after said landward end of said pipeline is towed into said body of water; and applying a tensional retarding force to said trailing tow line and said pipeline by means of said trailing tow vessel to hold said pipeline above said floor of said body of water.

6. The method of claim 5 further comprising:

connecting a leading tow line between a leading tow vessel and said seaward end of said pipeline after said pipeline is towed into said body of water; and disconnecting said pipeline launch line from said pipeline.

7. A method of launching a pipeline from an on-shore site into a body of water, said method comprising the steps of:

supporting said pipeline at said on-shore site with a plurality of ground engaging movable support means spaced along a length of said pipeline, said means of said plurality of support means being connected together by a support connecting line;

attaching a retarding line to a landward end of each of said pipeline and said support connecting line;

positioning a shallow draft barge off-shore from said site;

deploying a main launching line seaward from a seaward end of said barge to a main buoy located at a position in said body of water where said body of water has a depth sufficient to allow a launch vessel to approach said main buoy, said main launching line being provided with sufficient buoyancy means to hold said main launching line above a floor of said body of water;

connecting a pipeline launch line between a landward end of said barge and a seaward end of said pipeline;

connecting a support means launch line between said landward end of said barge and a seaward end of said support connecting line;

connecting a seaward end of said main launching line to said launch vessel;

moving said launch vessel seaward and thereby towing said pipeline and said support connecting line into said body of water;

applying a retarding force to said retarding line and thereby maintaining a tension force of said pipeline, as said pipeline is towed, sufficient to hold said pipeline above said floor of said body of water;

connecting a trailing tow line between a trailing tow vessel and said landward end of said pipeline after said landward end of said pipeline is towed into said body of water a distance such that said landward end of said pipeline is at a position on said body of water having a depth sufficient to float said trailing tow vessel;

applying a tensional retarding force to said trailing tow line and said pipeline by means of said trailing tow vessel to hold said pipeline above said floor of said body of water;

disconnecting said retarding line means from said pipeline;

connecting a leading tow line between a leading tow vessel and said seaward end of said pipeline; and disconnecting said pipeline launch line from said pipeline.

8. The method of claim 7, wherein:

said step of moving said launch vessel seaward is further characterized as moving said launch vessel seaward, when said body of water is at substantially its high tide mark, with a speed sufficient to tow said pipeline and said support connecting line entirely into said body of water while said body of water is at substantially its high tide mark.

9. A method of launching a pipeline from an on-shore site into a body of water, said method comprising the steps of:

supporting said pipeline at said on-shore site with a plurality of sleds having runners with wooden skids slidably engaging a pair of parallel rails extending into said body of water, said sleds being spaced along a length of said pipeline and being connected together by a support connecting line;

positioning a shallow draft barge off-shore from said site;

deploying a main launching line seaward from a seaward end of said barge to a main buoy located at a position in said body of water where said body of water has a depth sufficient to allow a launch vessel to approach said main buoy, said main launching line being provided with sufficient buoyancy means to hold said main launching line above a floor of said body of water;

connecting a pipeline launch line between a landward end of said barge and a seaward end of said pipeline;

connecting a support means launch line between said landward end of said barge and a seaward end of said support connecting line;

connecting a seaward end of said main launching line to said launch vessel;

moving said launch vessel seaward and thereby towing said pipeline and said support connecting line into said body of water;

applying a retarding force to said pipeline as said pipeline is towed by providing a predetermined frictional force between said skids and said rails sufficient to maintain a tension force on said pipeline and to hold said pipeline above said floor of said body of water;

connecting a retarding line means to a landward end of said pipeline before said landward end of said pipeline enters said body of water, and applying a retarding force to said retarding line means as said landward end of said pipeline is towed into said body of water thereby maintaining said tension force in said pipeline;

connecting a trailing tow line between a trailing tow vessel and said landward end of said pipeline after said landward end of said pipeline is towed into said body of water a distance such that said landward end of said pipeline is at a position on said body of water having a depth sufficient to float said trailing tow vessel;

applying a tensional retarding force to said trailing tow line and said pipeline by means of said trailing tow vessel to hold said pipeline above said floor of said body of water;

disconnecting said retarding line means from said pipeline;

connecting a leading tow line between a leading tow vessel and said seaward end of said pipeline; and disconnecting said pipeline launch line from said pipeline.

10. The method of claim 9, wherein:

said step of moving said launch vessel seaward is further characterized as moving said launch vessel seaward when said body of water is at substantially its high tide mark, with a speed sufficient to tow said pipeline and said support connecting line entirely into said body of water while said body of water is at substantially its high tide mark.

11. The method of claim 9, wherein:

said step of moving said launch vessel seaward is further characterized as moving said launch vessel seaward at a substantially constant speed.

* * * * *